Patented Oct. 14, 1952

2,614,087

UNITED STATES PATENT OFFICE 2,614,087

PREPARATION OF POLYVINYL ACETATE EMULSIONS

Norris Turnbull, Grand Island, N. Y., assignor to E. I. du Pont de Nemours and Company, Wilmington, Del., a corporation of Delaware No Drawing. Application August 12, 1950, Serial No. 179,093

8 Claims. (Cl. 260—29.6)

This invention relates to the emulsion polymerization of vinyl acetate and more particularly to the preparation of an improved aqueous dispersion of polyvinyl acetate.

Stable aqueous dispersions of polyvinyl acetate ordinarily called "polyvinyl acetate emulsions" are commonly made by dispersing monomeric vinyl acetate in water in the presence of a suitable dispersing agent, generally with the aid of rapid stirring or other suitable agitation and polymerizing the dispersed monomer by the addition of a polymerization catalyst at a suitable temperature or by subjecting it to other polymerizing conditions, for example, by exposure to actinic radiation. The art is replete with a variety of methods for carrying out such emulsion polymerizations to obtain the so-called emulsions which are relatively stable aqueous dispersions of solid polyvinyl acetate existing in the form of very fine particles.

Such vinyl acetate emulsions are useful for a variety of purposes, including adhesive and coating uses. The emulsions, when spread upon a solid surface and permitted to dry, form continuous films which are often transparent. Such films spread between two solid bodies and permitted to dry there form an excellent adhesive bond. For such coating and adhesive uses, the emulsions may be mixed with other ingredients, solid or liquid, to serve as fillers, pigments, reinforcing agents, extenders, plasticizers and solvents. For example, by suitable addition of pigments and solvents, the emulsions may be utilized in water-base paint formulations.

In the uses of the polyvinyl acetate emulsions as coatings and adhesives, difficulties have arisen because of the lack of adequate water resistance. The presence of the dispersing agent utilized in making the emulsion is mainly responsible for the lack of water resistance in films obtained from the emulsion. The dispersing agent tends to cause the redispersion of the polymer, thus imparting to the films the effect of water solubility to a greater or less extent.

Various methods have been proposed heretofore for reducing the water sensitivity of films obtained from polyvinyl acetate emulsions. One method is to treat the film during or after its formation with a substance which chemically reacts with the dispersing agent to destroy its effectiveness as a dispersing agent. In many emulsions which utilize water soluble grades of polyvinyl alcohol as dispersing agents, water sensitivity can be reduced more or less by treating the emulsion during or after a coating process with a material such as an aldehyde or the like which will insolubilize the polyvinyl alcohol, thereby destroying its dispersing activity. Such methods have the disadvantage of requiring additional operational steps such as treating the coated articles or mixing in a treating agent just prior to application of the vinyl resin emulsion. Another method comprises adding to the vinyl resin emulsion materials capable of insolubilizing the polyvinyl alcohol or other dispersing agent to the emulsion. This method has been only partially successful for the reason that generally such reagents tend to react with the dispersing agent while the emulsion is in storage or shipment, thus causing coagulation. It has long been desired to produce a stable polyvinyl acetate emulsion which can be stored and shipped for indefinite periods of time without coagulation and which, when spread into a film and dried at temperatures of 20 to 25° C. or higher, form a film which does not redisperse when contacted with water.

For many uses of the polyvinyl acetate emulsions high dilution stability is a very desirable property. In many applications, for example, in applying the vinyl resin to textile and paper products it is desired to dilute the emulsion with water to as low as 1 to 3% polymer concentration. Generally, it is not possible to dilute polyvinyl acetate emulsions to a polymer content of less than about 30% as at lower concentrations the emulsion becomes unstable and the vinyl resin particles tend to coagulate or settle out to an excessive extent. Consequently for applications requiring high dilutions, it has been necessary to add a protective colloid or thickening agent or to continuously agitate the diluted emulsion, or both.

An object of this invention is an improved process for the production of polyvinyl acetate emulsion. A further object is to prepare a polyvinyl acetate emulsion, stable during storage and shipment, from which substantially completely water-resistant films can be cast without the necessity of chemical or heat treatments. Another object is to prepare a polyvinyl acetate emulsion having a high dilution stability. Still other objects of the invention will be apparent from the following description.

The above objects may be attained in accordance with the present invention by the herein described method for polymerizing vinyl acetate. This method depends upon the use of a completely hydrolyzed grade of polyvinyl alcohol (or certain other polyhydroxy polymeric film-forming substance hereinafter described) as the dispersing agent, the utilization of a certain technique in carrying out the polymerization and the presence, during at least a part of the polymerization reaction, of a small amount of a long-chain, primary, monohydric aliphatic alcohol containing 8 to 20 carbon atoms per molecule.

In one method for polymerizing vinyl acetate in accordance with my invention, I may first dissolve a completely hydrolyzed grade of polyvinyl alcohol in hot water to form a solution containing from 4.5 to 6% by weight of the polyvinyl alcohol. I then add a small amount of vinyl acetate not exceeding 1.5 to 3% of the weight of the aqueous solution and disperse this by adequate agitation. Polymerization catalyst is then added and the dispersion, with continued agitation, is brought to a suitable temperature, for example, 82 to 90° C. so as to cause polymerization of the dispersed vinyl acetate. At any time after the polymerization reaction has started, including a time sufficient to completely polymerize the initial quantity of vinyl acetate, further small quantities of vinyl acetate are added, either continuously or intermittently, provided that the amount of vinyl acetate added or the rate of addition of vinyl acetate is such that the amount of vinyl acetate in the reaction mixture never exceeds 5% of the weight of the aqueous portion, so long as the amount of polymer formed does not exceed 20% of the weight of said aqueous portion. When the amount of polymer formed has increased to more than 20% by weight of the aqueous portion, the addition of the vinyl acetate monomer may be increased, if desired, so long as it is then not permitted to exceed 3% by weight of the aqueous portion. The process is continued until the desired amount of polymer formed has reached 30 to 40% by weight of the mixture. As the polymerization progresses, further amounts of catalyst may be added, as required to maintain a suitable catalyst concentration.

The pH of the reaction mixture must be controlled and at the start of the reaction mixture must be above 4, e. g., at a pH of 6 to 8. During the reaction the pH will fall, due to some hydrolysis of vinyl acetate to form acetic acid. At completion of the polymerization the pH will be less than 6, e. g., around 3 to 4.

Before or during the polymerization reaction I add to the reaction mixture a small amount of a high molecular weight, primary, monohydric alcohol, for example, lauryl alcohol in amount equal to 0.1 to 1% by weight of the water present.

The high molecular weight alcohol may be added either before or during the polymerization reaction, provided that the alcohol is added before the polymerization is more than 50% complete; I prefer to add the alcohol when the polymerization is 20 to 50% complete. By percent complete, I mean the proportion of vinyl acetate which has been polymerized based on the total that is to be polymerized. For example, if the completed polyvinyl acetate emulsion is to contain 50% by weight of polyvinyl acetate, the polymerization is considered 50% complete when half of the required amount of vinyl acetate has been polymerized, that is, when the polymer concentration reaches about 33%. However, the time at which the high molecular weight alcohol is added to the reaction mixture will depend upon the properties desired in the resulting emulsion. By adding the alcohol before the polymerization starts, I obtain a vinyl resin dispersion having exceedingly small particles and having high dilution stability. Emulsions made by this method generally can be diluted down to a polymer concentration of as low as 1 to 3% by weight with little or no loss of stability. On the other hand, if the alcohol is added when the polymerization is from 20 to 50% complete, the dilution stability is not quite as high, but the resulting emulsion will have a greater affinity for cotton and hence better suited for certain uses in coating cotton fabrics. More specifically, when cotton cloth is coated or impregnated with such emulsions, dried and then heat treated, e. g., by ironing, the dried polymer serves as a so-called "permanent starch," which is not removed by repeated laundering of the fabric. If the high molecular weight alcohol is added at the start of polymerization or before polymerization is 20% complete, when used as a "permanent starch," the polymer is less resistant to repeated laundering.

The amount of the high molecular weight alcohol such as lauryl alcohol may vary from about 0.1 to as high as about 5% of the weight of polyvinyl acetate in the finished emulsion. Preferably this proportion will not exceed 1%, as with higher proportions the resultant emulsion tends to have poor wetting properties. Also large amounts of the high molecular weight alcohol tend to inhibit polymerization to some extent. These deleterious effects of excess alcohol are not very great at proportions up to 5%.

The resulting polyvinyl acetate dispersions are latex-like or creamy compositions which yield clear, transparent, substantially water insoluble films of vinyl acetate when spread on solid surfaces and dried at temperatures of 20 to 25° C. or higher.

I have found that such non-redispersible film-forming emulsions cannot be made (1) by using a partially hydrolyzed grade of polyvinyl alcohol as the emulsifying agent, regardless of the rate of monomer addition nor (2) by using a completely hydrolyzed grade of polyvinyl alcohol as emulsifier when the rate of monomer addition during polymerization is not maintained as described above.

The invention is further illustrated by the following examples. In these examples the properties of the polyvinyl emulsions noted were determined by the following "characterization procedures," except as otherwise indicated.

*Characterization procedures*

*Particle size.*—The particle size of the emulsion is determined by examination of a highly diluted sample under a microscope equipped with a calibrated scale.

*pH.*—Beckmann pH meter (measured at 25° C.).

*Viscosity.*—The viscosity is determined at 25° C. with a Brookfield viscosimeter, with the spindle rotating at 60 R. P. M. and reported in centipoises (cp.).

*Air-dried film.*—A 0.008" thick wet film is cast on a 7½" x 17" ground glass plate with a Boston Bradley adjustable blade doctor knife. It is placed in a constant temperature room at 72° F. and 72% relative humidity for 24 hours. This film is used for observation of clarity, redispersion and number of oscillations-wet rubs.

*Redispersion.*—Redispersion is noted when the above film is wet with water and rubbed with a nylon brush; if the water becomes milky, redispersion is stated to occur.

*Number of oscillations-wet rubs.*—The above-indicated air-dried film is tested according to the Federal Specifications TTP–88a (with the modification that water instead of soap solution is used and no heat treatment of film is permitted) with a Gardner Model 105 washability and abrasion machine. In this test the film is scrubbed with a wet-weighted nylon brush. The number of oscillations of this wet scrubbing is noted when any area of the central 4" section of the film fails. A test of 4000 oscillations or better indicates excellent wet abrasion resistance. The designation "O. K." indicates no observable failure of the film.

*Per cent screen test.*—A 100-gram sample of the emulsion is diluted with water to 1000 grams and is run through a weighed 200 mesh per sq. in. screen. The screen is washed until the filtrate is clear. It is then dried in the oven to constant weight. (An emulsion of 0.1% or less screen test on 200 mesh screen is acceptable to most users of polyvinyl acetate emulsions. In many applications, an emulsion with a screen test of 0.2% or greater would have to be screened before use.)

*6% solids dilution settling test.*—The polyvinyl acetate emulsion is diluted with water to 6% solids and 100 cc. of the diluted emulsion is allowed to stand for 24 hours. A reading is taken of the number of cc. of sludge settled out. (This is an indication of dilution stability. An emulsion of less than 2 cc. can be used by most emulsion consumers who apply the emulsion in a dilute form. An emulsion which contains more than 3 cc. of sludge in 100 cc of 6% solids would be unsatisfactory for dilute application.)

EXAMPLE 1

*Materials*

| | |
|---|---|
| Water | 2000 gr. |
| Completely hydrolyzed grade of polyvinyl alcohol | 105.3 gr. (low sap. no high viscosity) |
| NaHCO$_3$ | 2.55 gr. |
| Vinyl acetate | 1472 gr. |
| Zinc formaldehyde sulfoxylate (6%) | 38.3 cc. |
| H$_2$O$_2$ (4%) | 38.3 cc. |

*Polymerization*

The polyvinyl alcohol and NaHCO$_3$ were stirred into the water in a reactor fitted with a sealed stirrer, reflux condenser, thermometer well and thermometer, and graduates for addition of catalyst (H$_2$O$_2$) and sulfoxylate. This mixture was cooked for one hour at about 90° C. 23 grams of vinyl acetate was added and thereafter, with continuous agitation, H$_2$O$_2$, the sulfoxylate and vinyl acetate were added at a rate which maintained a steady polymerization and so as to maintain the monomer content below 3% by weight. The polymerization temperature was maintained at 87° to 90° C. The polymerization time was two hours and eighteen minutes. The emulsion was cooled to room temperature with moderate agitation.

*Characterization*

| | |
|---|---|
| Particle size: | |
|     Predominant spheres | 1 micron |
|     Range spheres | .2 to 5. microns |
|     Agglomerates | up to 30 microns |
| pH | 4.5 |
| Viscosity | 700 cp. |
| Air-dried film | Slightly cloudy |
| Redispersion | None |
| Per cent screen test | 2% |
| 6% solids dilution settling test | 1.5 cc. |

EXAMPLE 2

*Materials*

| | |
|---|---|
| Water | 2000 gr. |
| Completely hydrolyzed grade of polyvinyl alcohol | 105.3 gr. (low sap. no high viscosity) |
| NaHCO$_3$ | 2.55 gr. |
| Lauryl alcohol | 11.2 gr. |
| Vinyl acetate | 1472 gr. |
| Zinc formaldehyde sulfoxylate (6%) | 32.2 cc. |
| H$_2$O$_2$ (4%) | 32.2 cc. |

*Polymerization*

The polymerization was carried out in the same reactor and under the same conditions indicated for Example 1, except for the use of lauryl alcohol to improve particle size. The lauryl alcohol was added to the cooked solution of polyvinyl alcohol before starting the polymerization. The polymerization temperature was maintained at 87° to 90° C. The time required for polymerization was two hours and twenty-five minutes. The emulsion was cooled to room temperature with moderate stirring.

*Characterization*

| | |
|---|---|
| Particle size: | |
|     Predominant spheres | 0.5 micron |
|     Range spheres | 0.5 to 3 microns |
|     Agglomerates | Very few |
| pH | 4.5 |
| Viscosity | 750 cp. |
| Air-dried film | Clear |
| Redispersion | None |
| Per cent screen test | 0.018% |
| 6% solids dilution settling test | 0.25 cc. |

EXAMPLE 3

*Materials*

| | |
|---|---|
| Water | 2000 gr. |
| Completely hydrolyzed grade of polyvinyl alcohol | 105.3 gr. |
| NaHCO$_3$ | 2.55 gr. |
| Lauryl alcohol | 3.7 gr. |
| Vinyl acetate | 1472 gr. |
| Zinc formaldehyde sulfoxylate (6%) | 35 cc. |
| H$_2$O$_2$ (4%) | 35 cc. |

*Polymerization*

The polymerization was carried out with the above materials in the same reactor and under the same conditions as indicated in Example 2. The polymerization temperature was maintained at 86° to 91°. The polymerization time was one hour and twenty minutes. The finished emulsion was cooled to room temperature with moderate stirring.

*Characterization*

| | |
|---|---|
| Particle size: | |
|     Predominant spheres | 0.5 micron |
|     Range spheres | 0.5 to 6. microns |
|     Agglomerates | up to 12 microns |
| pH | 4.5 |
| Air-dried film | Clear |
| Redispersion | None |
| Percent screen test | 0.34% |
| 6% solids dilution settling test | 1.0 cc. |

EXAMPLE 4

Materials

| | |
|---|---|
| Water | 1109 lbs. |
| Completely hydrolyzed grade of polyvinyl alcohol | 58 lbs., 5 oz. |
| NaHCO$_3$ | 1 lb., 6 oz. |
| Lauryl alcohol | 6 lbs., 8 oz. |
| Vinyl acetate | 815 lbs. |
| Zinc formaldehyde sulfoxylate (8%) | 24,200 cc. |
| Hydrogen peroxide (4%) | 20,900 cc. |

Polymerization

The polymerization was carried out in a 300 gallon jacketed Monel vessel fitted with an agitator, reflux condenser and flow-meters for the sulfoxylate and H$_2$O$_2$. The polyvinyl alcohol was slurried in the (cold) water charge and the sodium bicarbonate and lauryl alcohol were added. The mixture was cooked at 80° to 90° C. for about two hours. About 15 lbs. of vinyl acetate was added to displace air and establish a mild reflux. Vinyl acetate, H$_2$O$_2$ and sulfoxylate were added over a period of 4.3 hours. The maximum monomeric vinyl acetate content was 2.3%. The reactor was maintained at 86° to 89° C. during most of the run. The vinyl acetate content was reduced to 0.5% by steaming and the emulsion was cooled in another vessel made of stainless steel.

Characterization

Particle size:
  Predominant spheres <0.5 micron
  Range spheres ____ 0.2 to 5 microns
  Agglomerates _____ few up to ca. 20 microns
pH _____ 4.5
Viscosity _____ 50 cp.
Air-dried film _____ Clear and smooth
Redispersion _____ None
Percent screen test _____ 0.02%
6% solids solution settling test ____ 0.5 cc.

EXAMPLE 5

Materials

| | |
|---|---|
| Water | 1000 cc. |
| Completely hydrolyzed grade of polyvinyl alcohol | 52.6 gr. |
| NaHCO$_3$ | 1.275 gr. |
| "Lorol-5" (A commercial product containing about 90% of lauryl alcohol) | 5.6 gr. |
| Vinyl acetate | 736 gr. |
| Sodium formaldehyde sulfoxylate (6%) | 23.5 cc. |
| H$_2$O$_2$ (4%) | 23.5 cc. |

Polymerization

The polymerization was carried out as indicated in Example 2 except that the "Lorol-5" was dissolved in the vinyl acetate. The polymerization mixture was maintained at 86° to 93° C. The polymerization time was two hours and twenty-five minutes.

Characterization

Particle size:
  Predominant spheres _ ca. 0.1 micron
  Range spheres _____ 0.1 to 3 microns
  Agglomerates _____ up to ca. 20 microns
pH _____ 4.45
Viscosity _____ 760 cp.
Air-dried film _____ Clear
Redispersion _____ None
Percent screen test _____ 0.05%
6% solids dilution settling test ____ 0.5 cc.

EXAMPLE 6

Materials

| | |
|---|---|
| Water | 1000 cc. |
| Completely hydrolyzed grade of polyvinyl alcohol | 52.6 gr. |
| NaHCO$_3$ | 1.275 gr. |
| "Lorol-5" | 5.6 gr. |
| Vinyl acetate | 736 gr. |
| Zinc formaldehyde sulfoxylate (6%) | 25.3 cc. |
| H$_2$O$_2$ (4%) | 25.5 cc. |

Polymerization

The procedure was the same as in Example 5, but at a temperature of 85° to 90° C. The polymerization time was two hours and twenty-five minutes.

Characterization

Particle size:
  Predominant spheres _ Ca. 0.1 micron
  Range spheres _____ 0.1 to ca. 2 microns
  Agglomerates _____ up to 10.0 microns
pH _____ 4.95
Viscosity _____ 580 cp.
Air-dried film _____ Clear
Redispersion _____ None
Percent screen test _____ 0.039%
6% solids dilution settling test ____ 0.7 cc.

The polyvinyl alcohols suitable as emulsifiers in practicing my invention are those which are made by reacting polyvinyl acetate with an alcohol or water until at least 98% of the acetate groups have been converted to hydroxyl groups. I prefer to use polyvinyl alcohols which are thus 99 to 100% saponified. Such polyvinyl alcohols are herein and in the appended claims termed "completely hydrolyzed grade of polyvinyl alcohol."

The above described completely hydrolyzed grade of polyvinyl alcohol as generally made is insoluble or only slightly soluble in cold water, i. e., at temperatures below 50° C.; and in order to prepare an aqueous solution thereof for the practice of this invention I usually stir a mixture of water and the polyvinyl alcohol at a temperature above 50° C. until a substantially clear solution is found. Preferably, I stir the mixture to disperse the polyvinyl alcohol (in finely divided form) in the water and heat the dispersion at 80 to 95° C. for about one hour, to obtain a clear solution. Such solution may be cooled to room temperature, without precipitation of dissolved polyvinyl alcohol.

Certain polyhydroxy polymeric film-forming substances other than the completely hydrolyzed grades of polyvinyl alcohol may also be used as dispersing agents in my process, for example, certain starches and hydroxy alkyl celluloses. To serve as a substitute for completely hydrolyzed grades of polyvinyl alcohol in this process, the polymeric material must contain hydroxyl groups in proportions equal to or greater than that of other functional groups (such as ether groups, ester groups, carboxyl, sulfonyl and the like) and must also have substantially the water solubility characteristics described above. That is, it must be substantially insoluble or only slightly soluble in water at temperatures below 50° C. but soluble when heated with water at temperatures at or above 50° C. (e. g., 70 to 100° C.), to form solutions. One example is any of the various known "soluble" starches, which must be heated to 70° or higher in contact with water to form aqueous solutions. Such soluble starch, suitable for my purpose, may be made, for example, by partially sulfonating starch, so that less than half of the hydroxyl group of the starch are sulfonated. Other forms of modified starch containing a preponderance of free hydroxyl groups and having the above solubility characteristics may be used as well.

The hydroxy alkyl celluloses (hydroxy alkyl cellulose ethers) which have the above described solubility characteristics, e. g., hydroxy ethyl cellulose, also may be used in place of the completely hydrolyzed grades of polyvinyl alcohol to practice my invention.

The concentration of dispersing agent in the polymerization reaction mixture will vary, depending on its dispersing power and the viscosity of its aqueous solution. For example, a completely hydrolyzed grade of polyvinyl alcohol, a 4% by weight aqueous solution of which has a viscosity less than 100 centipoises at 20° C., will be employed as a 4.5 to 6% by weight aqueous solution. Still higher concentrations, e. g., 6 to 10%, may be employed if desired. Other completely hydrolyzed grades of polyvinyl alcohol whose aqueous solutions have higher viscosities may be used in lower concentrations, e. g., around 2%. In general the concentrations of dispersing agent in the practice of my invention does not depart from conventional practice in emulsion polymerization of vinyl acetate, sufficient dispersing agent being employed to form a stable dispersion of the resulting polymer.

The catalyst preferably used in my process is the type I term "activated peroxide type" polymerization catalyst, by which term I mean the combination of a peroxygen compound and a reducing agent, for example, a bisulfite, sulfurous acid, sulfoxylate or other sulfoxy compound having reducing properties. The peroxygen compound may be hydrogen peroxide, an organic peroxide such as benzoyl peroxide, acetyl peroxide or the like, an organic or inorganic peracid or a salt thereof, e. g., peracetic acid, perborates and persulfates. The best results generally are obtained by using a water soluble peroxygen compound, e. g., hydrogen peroxide or an inorganic persulfate or perborate. Also I generally prefer to add the peroxygen compound and the reducing compound separately to the polymerization reaction mixture. A preferred catalyst is the combination of hydrogen peroxide with a sulfoxylate, e. g., zinc formaldehyde sulfoxylate separately added. Such activated peroxygen type polymerization catalysts are well known in the art and are described, for example, in Brubaker et al., U. S. P. 2,462,354. While I prefer to utilize the above "activated peroxide" type of catalyst, the invention is not restricted thereto, as other catalyst suitable for the polymerization of vinyl acetate may be used, for example, any of the various peroxygen compounds such as those mentioned above, with or without the addition of reducing agents or other activating materials and the various azo compounds which have been more recently discovered to catalyze vinyl acetate polymerization.

The amount of catalyst and the temperature of the reaction mixture during the polymerization are not critical and may follow conventional procedures for the polymerization of vinyl acetate. I generally prefer to add the catalyst in small amounts simultaneously with the addition of the monomer, but such is not essential, so long as the catalyst concentration is maintained sufficiently high to cause polymerization.

In practicing my invention to produce stable polyvinyl acetate emulsions which on drying at 20 to 25° C. form films highly resistant to redispersion in water it is essential that:

(1) The dispersing agent be either a completely hydrolyzed grade of polyvinyl alcohol as defined above or other polyhydroxy polymeric substance in which free hydroxyl groups are present in amount equal to or greater than other functional groups and which is soluble in water at a temperature above 50° C. but insoluble in water at temperatures below 50° C.

(2) The amount of monomeric vinyl acetate present in the reaction mixture does not exceed 5% of the weight of the water present when the polymer content of the emulsion is 20% by weight or less, and does not exceed 3% of the weight of the water when the polymer content is above 20% by weight.

(3) The initial pH of the polymerization reaction mixture must be above 4 and must be permitted to fall to a pH not higher than 6 before completion of the reaction.

(4) The polymerization is continued until the polymer content has reached at least 20% by weight but not more than about 40%.

If any one of the above four requirements is not met in the polymerization procedure, the resulting product will not be a stable emulsion which forms water-resistant films on drying. For example, if the dispersing agent is a partially hydrolyzed grade of polyvinyl alcohol, the resulting emulsion will not form water-resistant films, regardless of the regulation of monomer content during polymerization. If the monomer content of the reaction mixture initially exceeds 5% or exceeds 3% when the polymer content is above 20% during the polymerization reaction, the water resistance of films cast from the resulting product will be unsatisfactory.

Proceeding in accordance with the above stated four essential requirements, dispersions which produce films not redispersible in water can be made without the addition of the high molecular weight alcohol. However, without the addition of a high molecular weight alcohol, e. g., lauryl alcohol, before the polymerization is more than 50% complete, the emulsion will not have a high dilution stability. The dilution stability can be evaluated by means of the "6% Solids Dilution Settling Test" described above. As shown by the above examples, the addition of the high molecular weight alcohol markedly reduces the amount of solids settled out in 24 hours from an emulsion diluted to 6% polymer concentration. In general the effect of the lauryl alcohol or other suitable high molecular weight alcohol is to decrease the particle size of the dispersed polymer and also to decrease the amount of agglomerates. This effect is demonstrated by the above described "Percent Screen Test."

In place of lauryl alcohol, I may employ any monohydric, primary alcohol containing 8 to 20 carbon atoms in the molecule, either straight-chain or branched chain, provided that the molecule contains at least one chain of not less than 8 carbon atoms. The alcohol may be saturated or monoolefinic; that is, it may have not more than one olefinic group —CH=CH—. I prefer to employ saturated alcohols, as the monoolefinic alcohols tend to inhibit polymerization, requiring the employment of large amounts of polymerization catalyst. Thus, the suitable alcohols may be expressed by the generic formula $C_xH_yOH$, where $x=8$ to 20 and $y=2x+1$ or $2x-1$, with the proviso that the radical $C_xH_y$ contains a straight-chain of not less than 8 carbon atoms. Examples of such alcohols are:

$$C_8H_{17}OH$$

n-Octyl alcohol $$C_{10}H_{21}OH$$

n-Decyl alcohol $$C_{12}H_{25}OH$$

Lauryl alcohol $$C_{18}H_{37}OH$$

n-Octadecyl alcohol $$CH_3(CH_2)_7CH=CH(CH_2)_8OH$$

Oleyl alcohol $$CH_3(CH_2)_{12}CH_2OH$$

Myristic alcohol $$C_{16}H_{33}OH$$

Cetyl alcohol $$C_{17}H_{35}OH$$

n-Heptadecylalcohol $$CH_3CH(CH_2)_3CH(CH_2)_3CH(CH_2)_3-C-CH-CH_2OH$$
$$\quad\;\; |\qquad\quad |\qquad\quad |\qquad\quad |\;\;\;\;|$$
$$\;\;\;CH_3\;\;\;\;\;CH_3\;\;\;\;\;CH_3\;\;\;\;CH_3$$

Phytol (3,7,11,15,-tetramethyl-2-hexadecen-1-ol)

The optimum chain length for the high molecular weight alcohol is $C_{12}$ and lauryl alcohol is the preferred species. In the homologous series of straight-chain, saturated primary alcohols $C_nH_{2n+1}OH$, where $n=8$ to 20, the best results are obtained with lauryl alcohol ($C_{12}H_{25}OH$); and the above described beneficial results decrease as the number of carbon atoms become either greater or less than 12.

Mixtures of the alcohols may be used in place of a pure alcohol. A preferred mixture is a proprietary composition known as "Lorol" which is a somewhat impure mixture of high molecular weight alcohols containing around 90% of lauryl alcohol.

Control of monomer content of the polymerization reaction mixture is an important and essential feature of my process. During the reaction, the monomer content, regulated by the rate of addition of monomer, must not exceed 5% by weight of the reaction mixture when the polymer content is 20% by weight or less and must not exceed 3% by weight when the polymer content exceeds 20%. Preferably, I begin the reaction with around 1 to 1.5% of vinyl acetate in the emulsion and maintain the vinyl acetate content at 1.5 to 3% during most of the reaction. By employing a nitrogen atmosphere to exclude air as described below, I may maintain the vinyl acetate monomer content at not over about 0.4%, which gives the best product at reasonably low catalyst consumption. If desired, the monomer content may be maintained as low as 0.1%. To control the monomer concentration, the vinyl acetate is added substantially at the rate of its polymerization and catalyst is added continuously or intermittently as required to maintain reaction.

It is desirable to exclude air from the reaction mixture, as molecular oxygen has an inhibitory effect on the polymerization. Preferably, the air is excluded by operating in a closed reactor equipped with a reflux condenser and maintaining an atmosphere of vinyl acetate vapor over the reaction mixture. Alternatively, the reactor free space may be filled with an oxygen-free, inert gas such as nitrogen.

In practicing my invention, for the best results the polyvinyl alcohol should be substantially completely dissolved in the water before the vinyl acetate and polymerization catalyst are added. As most of the completely hydrolyzed grades of polyvinyl alcohol are difficult to dissolve in cold water, I generally heat and stir a mixture of the polyvinyl alcohol and water at 70 to 100° C. until substantially complete solution is obtained.

It is essential that the pH of the polymerization reaction mixture initially be above 4 and I prefer an initial pH of around 6 to 8. To insure a reasonably high pH I generally prefer to add a mild alkaline buffer such as sodium bicarbonate, disodium phosphate, sodium acetate, or the like. If the mixture initially contains acetic acid, it may be neutralized by adding the above alkali or a stronger alkali such as sodium hydroxide, sodium carbonate or the like. As the polymerization proceeds, the pH of the reaction mixture generally falls, due to formation of acetic acid, caused by hydrolysis of part of the vinyl acetate monomer. Preferably, the initial pH is so adjusted (e. g., to pH of 6 to 8) so that the final pH is above 4. However a good product may be obtained at a final pH below 4, provided that during the greater part of the reaction the pH is above 4. When a mild alkaline buffer such as sodium bicarbonate or disodium phosphate is used to adjust the initial pH, I prefer to add the buffer to the water before dissolving the polyvinyl alcohol therein.

If the initial pH is below 4, the resulting emulsion produces water dispersible films. Low initial pH also tends to cause undue thickening of the emulsion, increase in particle size of the dispersed polymer, aggregation of particles and coagulation.

The polymerization temperature is not particularly critical and temperatures conventionally employed for polymerizing vinyl acetate with peroxide catalysts are suitable, e. g., from 50 to 90° C. I generally prefer to maintain the reaction mixture at reflux temperature, e. g., at 85 to 90° C. In operating at lower temperatures without refluxing, I prefer to maintain a nitrogen atmosphere in the reactor to exclude air.

The emulsions prepared as described herein are aqueous dispersions of solid polyvinyl acetate having improved characteristics. Films made by drying these emulsions at 20 to 25° C. or higher are substantially insoluble (i. e., not redispersible) in water at any temperature. These emulsions are further characterized by unusually small particle size of the polyvinyl acetate, high stability, both in concentrated and diluted forms, and relative freedom from agglomerates. The emulsions are useful for a variety of purposes, particularly for coating solid surfaces, and as adhesives. For such purposes the emulsions may be used per se or in combination with other ingredients such as pigments, extenders, fillers, plasticizers, colorants and the like.

I claim:

1. The process which comprises dispersing vinyl acetate monomer in a 2 to 10% by weight aqueous solution of a hydrophilic dispersing agent which is a polyhydroxy, polymeric, film-forming substance substantially insoluble in water at temperatures below 50° C. but soluble in water at a temperature not lower than 50° C. to form a dispersion containing not more than 5% by weight of said monomer, subjecting said dispersion to polymerization in the presence of a peroxygen type catalyst, while dispersing therein further quantities of said monomer so as to maintain a monomer concentration not greater than 5% by weight when the polymer concentration is not over 20% by weight and not greater than 3% by weight when the polymer content has exceeded 20% by weight, continuing as above until the polymer content has reached 20 to 40% by weight, controlling the pH of the polymerization reaction mixture so that it is initially not less than 4 and finally not greater than 6 and adding to the reaction mixture before polymerization is 50% complete a primary, aliphatic alcohol having at least one chain of carbon atoms not less than 8 carbon atoms in length and corresponding to the formula $C_xH_yOH$, where $x=8$ to 20 and $y=$ one of the values selected from the group consisting of $2x+1$ and $2x-1$, in amount equal to 0.1 to 5% by weight of the total vinyl acetate polymerized, the concentration of said dispersing agent being sufficient to form a stable emulsion of the resulting polyvinyl acetate.

2. The process which comprises dispersing vinyl acetate monomer in a 2 to 10% by weight aqueous solution of a hydrophilic dispersing agent which is a polyhydroxy, polymeric, film-forming substance substantially insoluble in water at temperatures below 50° C. but soluble in water at a temperature not lower than 50° C. to form a dispersion containing not more than 5% by weight of said monomer, subjecting said dispersion to polymerization in the presence of a peroxygen type catalyst, while dispersing therein further quantities of said monomer so as to maintain a monomer concentration not greater than 5% by weight when the polymer concentration is not over 20% by weight and not greater than 3% by weight when the polymer content has exceeded 20% by weight, continuing as above until the polymer content has reached 20 to 40% by weight, controlling the pH of the polymerization reaction mixture so that it is initially not less than 4 and finally not greater than 6 and adding to the reaction mixture before polymerization is 50% complete a straight-chain alcohol having the formula $C_nH_{2n+1}OH$ where $n=8$ to 20, in amount equal to 0.1 to 5% by weight of the total vinyl acetate polymerized, the concentration of said dispersing agent being sufficient to form a stable emulsion of the resulting polyvinyl acetate.

3. The process which comprises dispersing vinyl acetate monomer in a 2 to 10% by weight aqueous solution of a completely saponified grade of polyvinyl alcohol in concentration of said monomer equal to 0.1 to 5% by weight, subjecting the resulting dispersion to polymerization in the presence of peroxygen type polymerization catalyst and adding and dispersing therein further amounts of said monomer in such quantities that the monomer concentration never exceeds a certain value, depending upon the concentration of dispersed polymer, as follows: not over 5% when the polymer concentration is not over 20% by weight; not over 3% when the polymer concentration is more than 20% by weight; continuing said addition of monomer until the resulting dispersion contains 20 to 40% by weight of polymer, controlling the pH of the polymerization reaction mixture so that it is initially not less than 4 and finally not more than 6 and adding to the reaction mixture before polymerization is 50% complete a straight-chain alcohol having the formula $C_nH_{2n+1}OH$ where $n=8$ to 20, in amount equal to 0.1 to 1% by weight of total vinyl acetate polymerized, the concentration of said polyvinyl alcohol being sufficient to form a stable emulsion of the resulting polyvinyl acetate.

4. The process according to claim 3 in which the polymerization catalyst is an activated peroxide type and the straight-chain alcohol is lauryl alcohol.

5. The process according to claim 4 in which the polymerization catalyst comprises hydrogen peroxide and a sulfoxylate, separately added to the reaction mixture.

6. The process according to claim 5 in which the monomer content is regulated not to exceed 3% by weight throughout the polymerization reaction.

7. The process according to claim 6 in which the aqueous solution of polyvinyl alcohol is prepared by dispersing and heating the polyvinyl alcohol in water containing sufficient alkaline salt to adjust the pH to above 4.

8. The process according to claim 7 in which the alkaline salt is sodium bicarbonate and the pH is adjusted to 6 to 8.

NORRIS TURNBULL.

REFERENCES CITED

The following references are of record in the file of this patent:

UNITED STATES PATENTS

| Number | Name | Date |
|---|---|---|
| 2,245,040 | Marks | June 10, 1941 |
| 2,317,138 | Fletcher | Apr. 20, 1943 |
| 2,508,341 | Wilson | May 16, 1950 |
| 2,535,189 | Benson et al. | Dec. 26, 1950 |